US012680962B2

(12) United States Patent
Hirayama et al.

(10) Patent No.: US 12,680,962 B2
(45) Date of Patent: Jul. 14, 2026

(54) CAR BODY INSPECTION DEVICE, CAR BODY INSPECTION SYSTEM, AND CAR BODY INSPECTION METHOD

(71) Applicants: Rie Hirayama, Kanagawa (JP); Koji Masuda, Kanagawa (JP); Teruki Kamada, Kanagawa (JP); Takahiro Kiyama, Tokyo (JP); Yuta Inoue, Kanagawa (JP)

(72) Inventors: Rie Hirayama, Kanagawa (JP); Koji Masuda, Kanagawa (JP); Teruki Kamada, Kanagawa (JP); Takahiro Kiyama, Tokyo (JP); Yuta Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 143 days.

(21) Appl. No.: 18/602,087

(22) Filed: Mar. 12, 2024

(65) Prior Publication Data

US 2024/0310293 A1 Sep. 19, 2024

(30) Foreign Application Priority Data

Mar. 14, 2023 (JP) ................................. 2023-040026

(51) Int. Cl.
*G01N 21/88* (2006.01)
*G01N 21/55* (2014.01)
*G01N 35/00* (2006.01)

(52) U.S. Cl.
CPC ......... *G01N 21/8806* (2013.01); *G01N 21/55* (2013.01); *G01N 35/0092* (2013.01);
(Continued)

(58) Field of Classification Search
CPC .... G01N 21/01; G01N 21/8806; G01N 21/55; G01N 21/9515; G01N 2021/8809;
(Continued)

(56) References Cited

U.S. PATENT DOCUMENTS

| | | | | |
|---|---|---|---|---|
| 5,436,726 | A | * | 7/1995 | Ventura .............. G01N 21/8806 356/613 |
| 5,726,705 | A | * | 3/1998 | Imanishi ............ G01N 21/8806 356/600 |

(Continued)

FOREIGN PATENT DOCUMENTS

| | | | | |
|---|---|---|---|---|
| JP | 2003270162 | A | * | 9/2003 |
| JP | 2014-081356 | A | | 5/2014 |

(Continued)

OTHER PUBLICATIONS

Extended European Search Report mailed Sep. 9, 2024 in European Patent Application No. EP24160775.3 (8 pages).

*Primary Examiner* — Kara E. Geisel
*Assistant Examiner* — Christina I Xing
(74) *Attorney, Agent, or Firm* — XSENSUS LLP

(57) ABSTRACT

A car body inspection device includes a main inspection device includes an illuminator to illuminate a surface of a car body; a light receiver to receive specular reflection light from a first inspection area of the surface illuminated by the illuminator; and circuitry configured to inspect the first inspection area based on the specular reflection light received by the light receiver. The main inspection device is coupled to an auxiliary inspection device to inspect a second inspection area other than the first inspection area on the surface, and the light receiver of the main inspection device does not receive the specular reflection light in the second inspection area.

6 Claims, 8 Drawing Sheets

1

(52) U.S. Cl.
CPC ................ *G01N 2021/8809* (2013.01); *G01N 2201/06153* (2013.01)

(58) Field of Classification Search
CPC . G01N 2201/06153; G01N 2021/8427; G01N 35/0092; G01B 11/30
See application file for complete search history.

(56) References Cited

U.S. PATENT DOCUMENTS

| | | | |
|---|---|---|---|
| 2007/0177137 | A1 | 8/2007 | Kamada |
| 2009/0238590 | A1 | 9/2009 | Masuda |
| 2011/0043810 | A1 | 2/2011 | Suzuki et al. |
| 2011/0044713 | A1 | 2/2011 | Masuda et al. |
| 2012/0268750 | A1 | 10/2012 | Masuda |
| 2013/0216267 | A1 | 8/2013 | Masuda et al. |
| 2014/0023391 | A1 | 1/2014 | Masuda |
| 2014/0071443 | A1 | 3/2014 | Suzuki et al. |
| 2015/0037057 | A1 | 2/2015 | Masuda |
| 2015/0043936 | A1 | 2/2015 | Masuda et al. |
| 2015/0168310 | A1 | 6/2015 | Suzuki et al. |
| 2018/0326591 | A1* | 11/2018 | Häusler .................. G01B 11/24 |

FOREIGN PATENT DOCUMENTS

| | | |
|---|---|---|
| JP | 2017-156097 A | 9/2017 |
| JP | 2021-009080 A | 1/2021 |
| JP | 2021-075023 A | 5/2021 |
| JP | 2021-139816 A | 9/2021 |

* cited by examiner

CAR BODY INSPECTION DEVICE, CAR BODY INSPECTION SYSTEM, AND CAR BODY INSPECTION METHOD

CROSS-REFERENCE TO RELATED APPLICATIONS

This patent application is based on and claims priority pursuant to 35 U.S.C. § 119(a) to Japanese Patent Application No. 2023-040026, filed on Mar. 14, 2023 in the Japan Patent Office, the entire disclosure of which is hereby incorporated by reference herein.

BACKGROUND

Technical Field

The present disclosure relates to a car body inspection device, a car body inspection system, and a car body inspection method.

Related Art

An inspection device that inspects a car paint surface for defects is known. For example, a paint inspection device includes an illumination member that projects pattern light on a painted object surface, a camera that captures an image of the pattern projected on the object surface, and a handle member to which the illumination member and the camera are attached and that is suitable for an operator to hold. The operator operates the handle member to scan the paint surface during the inspection.

SUMMARY

According to an embodiment of the present disclosure, a car body inspection device includes a main inspection device including: an illuminator to illuminate a surface of a car body; a light receiver to receive specular reflection light from a first inspection area of the surface illuminated by the illuminator; and circuitry configured to inspect the first inspection area based on the specular reflection light received by the light receiver. The main inspection device is coupled to an auxiliary inspection device to inspect a second inspection area other than the first inspection area on the surface, and the light receiver of the main inspection device does not receive the specular reflection light in the second inspection area.

According to an embodiment of the present disclosure, a car body inspection system includes a main inspection device including: an illuminator to illuminate a surface of a car body; a light receiver to receive specular reflection light from a first inspection area of the surface illuminated by the illuminator; and circuitry configured to inspect the first inspection area based on the specular reflection light received by the light receiver; and an auxiliary inspection device coupled to the main inspection device to inspect a second inspection area other than the first inspection area on the surface. The light receiver of the main inspection device does not receive the specular reflection light in the second inspection area.

According to an embodiment of the present disclosure, a car body inspection method includes illuminating a surface of a car body; receiving specular reflection light from a first inspection area of the surface illuminated; inspecting the first inspection area based on the specular reflection light received from the first inspection area; and inspecting a second inspection area other than the first inspection area in which the specular reflection light is not received by the receiving, to inspect the surface of the car body.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 3A and 3B are diagrams illustrating example aspects of non-inspectable areas of the main inspection device according to the first embodiment of the disclosure;

Figure 1:
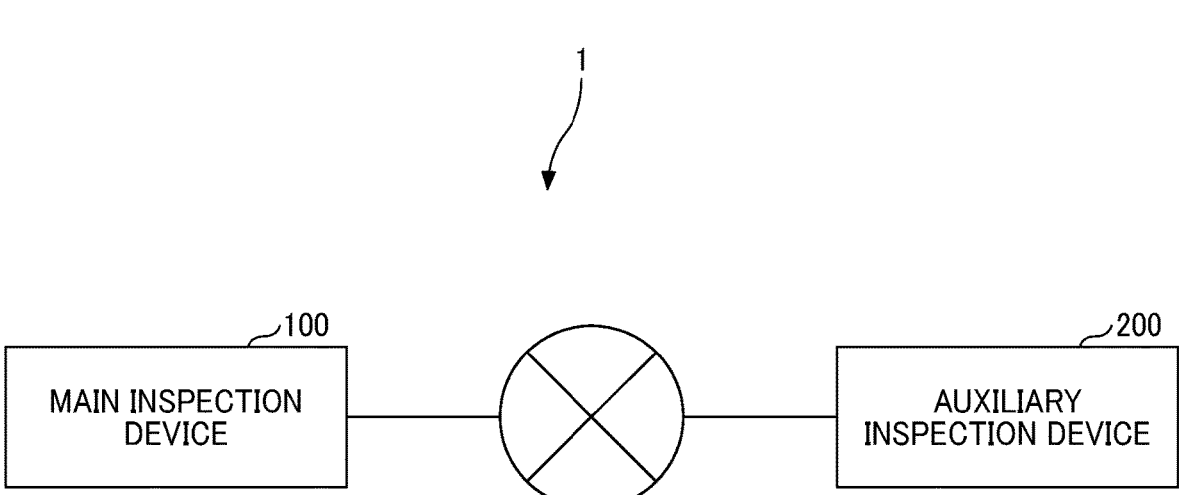
FIG. 1 is a system block diagram of a car body inspection system according to a first embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

In a typical paint inspection device, the car paint surface includes multiple areas having different directions of the normal to the surface and different magnitudes of curvature depending on the positions within the paint surface. To uniformly capture specular reflection light from the entire paint surface having such a complicated surface shape, the number of cameras increases, and the efficiency of the inspection device decreases.

With the embodiments of the present disclosure, the inspection efficiency can be increased.

Embodiments for implementing the disclosure are described below referring to the drawings. Like reference signs are applied to identical or corresponding components throughout the drawings and redundant description may be omitted.

First Embodiment

A car body inspection system 1 according to a first embodiment of the disclosure is described referring to FIG. 1. FIG. 1 is a system block diagram of the car body inspection system 1 according to the first embodiment of the disclosure. As illustrated in FIG. 1, the car body inspection system 1 according to the first embodiment of the disclosure includes a main inspection device 100 and an auxiliary inspection device 200. The main inspection device 100 inspects a first inspection area of a car body. The auxiliary inspection device 200 inspects a second inspection area of the car body. It is desirable to use multiple auxiliary inspection devices 200. The main inspection device 100 and the auxiliary inspection device 200 are connected to each other. It is desirable to connect the main inspection device 100 and the auxiliary inspection device 200 to each other to allow communication in a wired or wireless manner. In one example, the main inspection device 100 and the auxiliary inspection device 200 may be connected to each other to allow communication via another information processing device such as a server device. The main inspection device 100 and the auxiliary inspection device 200 are examples of a "car body inspection device".

A car body inspection system includes a main inspection device including: an illuminator to illuminate a surface of a car body; a light receiver to receive specular reflection light from a first inspection area of the surface illuminated by the illuminator; and controller configured to inspect the first inspection area based on the specular reflection light received by the light receiver; and an auxiliary inspection device coupled to the main inspection device to inspect a second inspection area other than the first inspection area on the surface. The light receiver of the main inspection device does not receive the specular reflection light in the second inspection area.

A car body inspection method includes illuminating a surface of a car body; receiving specular reflection light from a first inspection area of the surface illuminated; inspecting the first inspection area based on the specular reflection light received from the first inspection area; and inspecting a second inspection area other than the first inspection area in which the specular reflection light is not received by the receiving, to inspect the surface of the car body.

The car body inspection system 1 inspects a car body. The car body is a body of a painted automobile, such as a large, ordinary, or small automobile. For example, the car body inspection system 1 inspects a surface defect of a paint surface of a door, a hood, a roof, a trunk lid, a rear bumper, or the like included in the car body. In this case, the "surface defect" represents a defect in the paint surface, such as a scratch, a crack, an unevenness, a stain, or a discoloration failure formed in the paint surface of the car body. The paint surface is an example of a "surface".

The car body inspection system 1 inspects, as an inspection target, a paint surface of each of multiple car bodies conveyed in an inspection line. In general, multiple car bodies having different appearances such as shapes or colors are conveyed in random order in an inspection line. The car body inspection system 1 inspects paint surfaces of multiple car bodies having different appearances using the main inspection device 100 and the auxiliary inspection device 200 that are at least two types of car body inspection devices.

More specifically, the car body inspection system 1 determines a first inspection area as an area to be inspected by the main inspection device 100 and a second inspection area as an area difficult to be inspected by the main inspection device 100, on a paint surface of a car body. The car body inspection system 1 causes the auxiliary inspection device 200 to inspect the second inspection area. The first inspection area and the second inspection area do not overlap each other on the surface of the car body. Thus, inspection accuracy and inspection efficiency are increased.

Inspectable Area and Non-Inspectable Area

Figure 2:
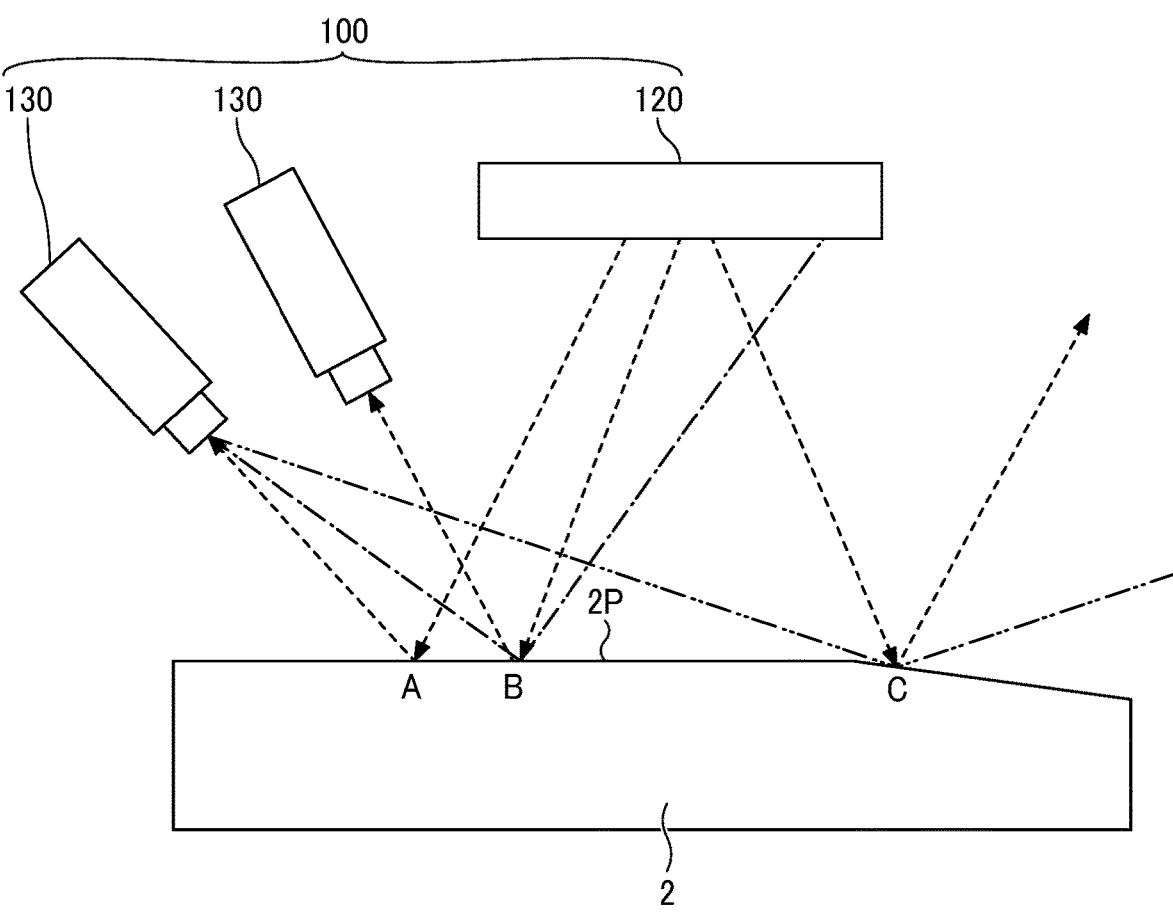
FIG. 2 is a diagram illustrating an inspectable area and a non-inspectable area of a main inspection device according to the first embodiment of the disclosure.
Figures 3A, 3B:
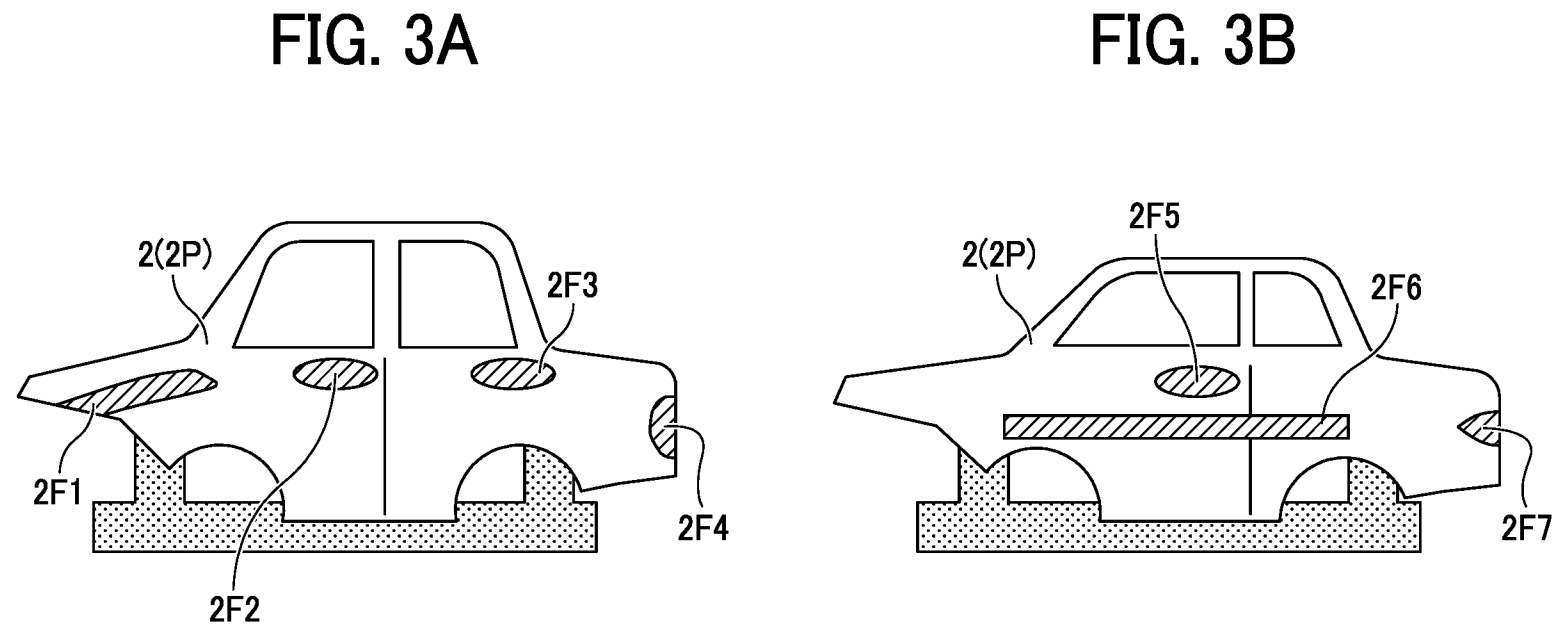

An inspectable area and a non-inspectable area of the car body inspection system 1 are described referring to FIGS. 2, 3A, and 3B. FIG. 2 is a diagram illustrating an inspectable area and a non-inspectable area of the main inspection device 100 according to the first embodiment of the disclosure. FIG. 2 illustrates a car body 2 and the main inspection device 100 that inspects the car body 2. In the following description, an inspectable area and a non-inspectable area of a "car body inspection device" are described, as a car body inspection device including the main inspection device 100.

For example, the main inspection device 100 illustrated in FIG. 2 includes one illumination unit 120 (or an illuminator) and two light receivers 130. The illumination unit 120 and the light receivers 130 are disposed with respect to a paint surface 2P of the car body 2. The paint surface 2P of the car body 2 includes an area A, an area B, and an area C.

The illumination unit 120 illuminates the surface of the car body. The illumination unit 120 desirably includes multiple light sources. Examples of the light sources include a semiconductor light-emitting element, such as a light-emitting diode (LED); a fluorescent lamp; and a halogen lamp. The light source desirably emits visible light; however, the light source may emit light in another wavelength band, such as infrared light. In one example, the illumination unit 120 may be a liquid crystal display or a projector.

The illumination unit 120 may further include various optical members, such as a diffusion plate, a reflecting plate, and a lens element. The illumination unit 120 according to the first embodiment diffuses light emitted from LEDs using the diffusion plate, and illuminates an inspection surface with parallel illumination light having no irradiation unevenness.

The light receivers 130 each receive specular reflection light from an area of the paint surface 2P illuminated by the illumination unit 120. An area of the paint surface 2P from which the light receiver 130 has received the specular reflection light serves as a first inspection area. An area of the paint surface 2P from which the light receiver 130 does not receive the specular reflection light serves as a second inspection area.

The light receiver 130 receives the specular reflection light from the paint surface 2P illuminated by the illumination unit 120. Examples of the light receiver 130 include an image-capturing device such as a camera including an imaging element, such as a charge coupled device (CCD) or a complementary metal-oxide-semiconductor (CMOS). When the light receiver 130 is an image-capturing device, the image-capturing device acquires image information on the inspection surface. When the image-capturing device is a visible light camera, the visible light camera acquires color image information. As another image-capturing device, an infrared camera or the like may be used. In one example, the image-capturing device may acquire monochrome image information.

The paint surface 2P of the car body 2 is a smooth surface having gloss. Thus, light incident on the paint surface 2P from the illumination unit 120 has an incident angle and a reflection angle equal to each other, and is specularly reflected (mirror-reflected). Also, the paint surface 2P is a set of multiple curved surface areas having different directions of the normal and different curvatures.

On the paint surface 2P, for example, it is assumed that specular reflection light (light indicated by a broken line in FIG. 2) from the flat area A substantially parallel to the light emission surface of the illumination unit 120 is received by the first light receiver 130. Like the area A, it is assumed that specular reflection light (light indicated by a broken line in FIG. 2) from the area B having an orientation and a surface shape with respect to the light emission surface of the illumination unit 120 is received by the second light receiver 130. In this case, the area A and the area B are inspectable areas.

In contrast, it is assumed that specular reflection light (light indicated by a broken line in FIG. 2) from the area C that is inclined with respect to the area A and the area B and is non-parallel to the light emission surface of the illumination unit 120 is not received by any of the two light receivers 130. That is, in any of images captured by the two light receivers 130, a portion corresponding to the area C is a dark portion. In this case, the area C is a non-inspectable area.

As described above, the first light receiver 130 (the light receiver on the left in FIG. 2) receives the specular reflection light that is emitted from the illumination unit 120 and is specularly reflected in the area A. The second light receiver 130 also receives specular reflection light (light indicated by a one-dot chain line in FIG. 2) that is specularly reflected in the area B. In contrast, light (light indicated by a two-dot chain line in FIG. 2) reflected from the area C and captured by the first light receiver 130 (the light receiver on the left in FIG. 2) does not originate from the illumination light of the illumination unit 120. The same applies to the second light receiver 130 (the light receiver on the right in FIG. 2). That is, an inspectable area and a non-inspectable area exist for each light receiver 130.

As described above, the position, size, or range of the inspectable area or the non-inspectable area varies depending on various conditions such as the position, orientation of the light emission surface, and illumination range of the illumination unit 120; the position and angle of view of the light receiver 130; and the surface shape of the paint surface 2P. On the paint surface 2P of the car body 2, for example, an area in which the curvature significantly changes with respect to a peripheral area, such as a recessed portion of a door handle, or a physically discontinuous area, such as a boundary between adjacent doors, serves as a non-inspectable area.

FIGS. 3A and 3B are diagrams illustrating example aspects of non-inspectable areas of the main inspection device 100 according to the first embodiment of the disclosure. FIG. 3A illustrates non-inspectable areas 2F1, 2F2, 2F3, and 2F4 appearing on a car body 2. FIG. 3B illustrates non-inspectable areas 2F5, 2F6, and 2F7 appearing on another car body 2. For example, the non-inspectable areas 2F1 to 2F7 include non-inspectable areas different in size, shape, and position at multiple positions of the paint surfaces 2P. Since the car bodies 2 are sequentially conveyed by a conveyance unit such as a conveyor during a car body inspection, a change in the shape or the like of the paint surface 2P of a car body 2 occurs also in car bodies 2 of the same car type.

Main Inspection Device

Figure 4:
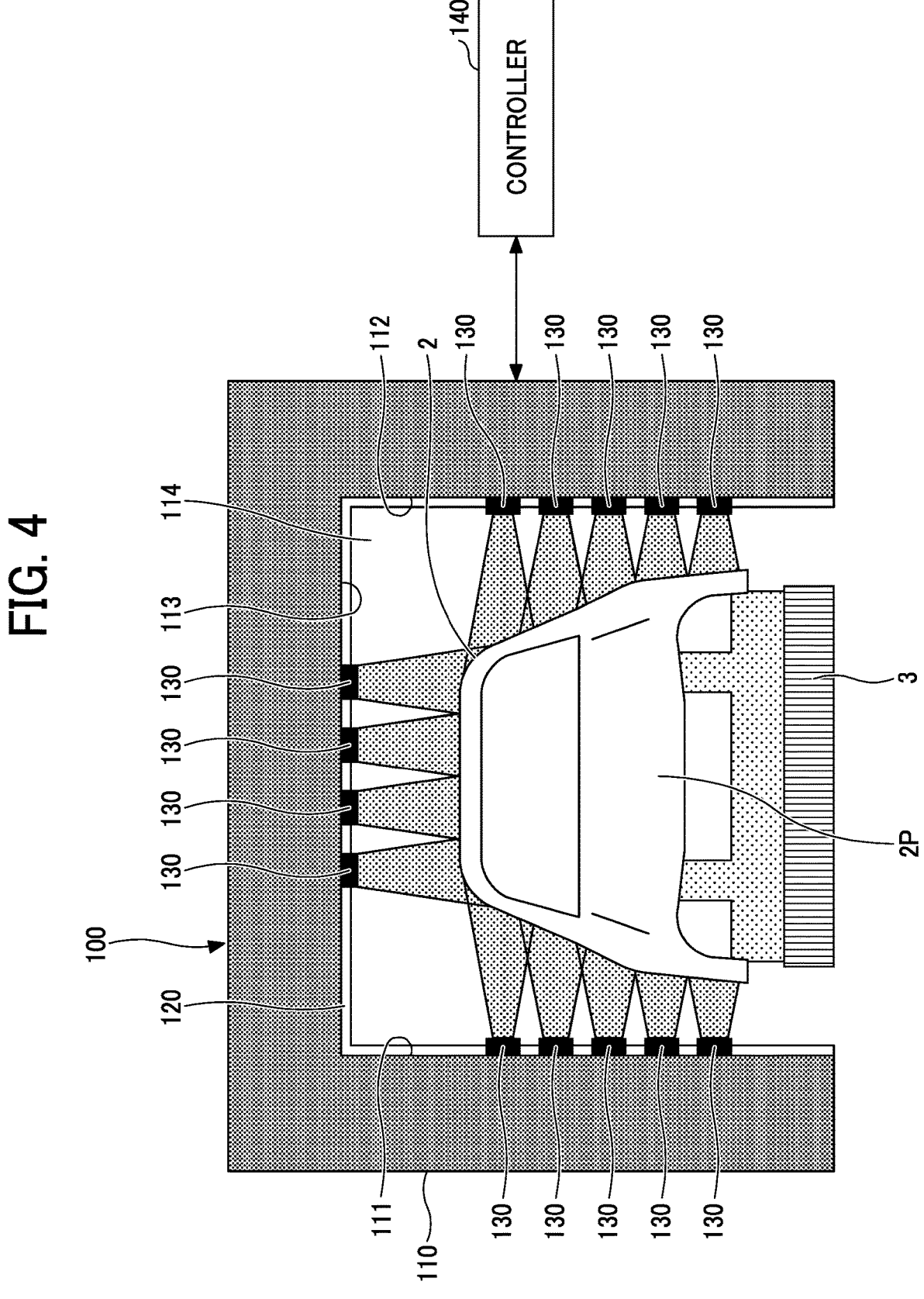
FIG. 4 is a front view of the main inspection device according to the first embodiment of the disclosure.
Figure 5:
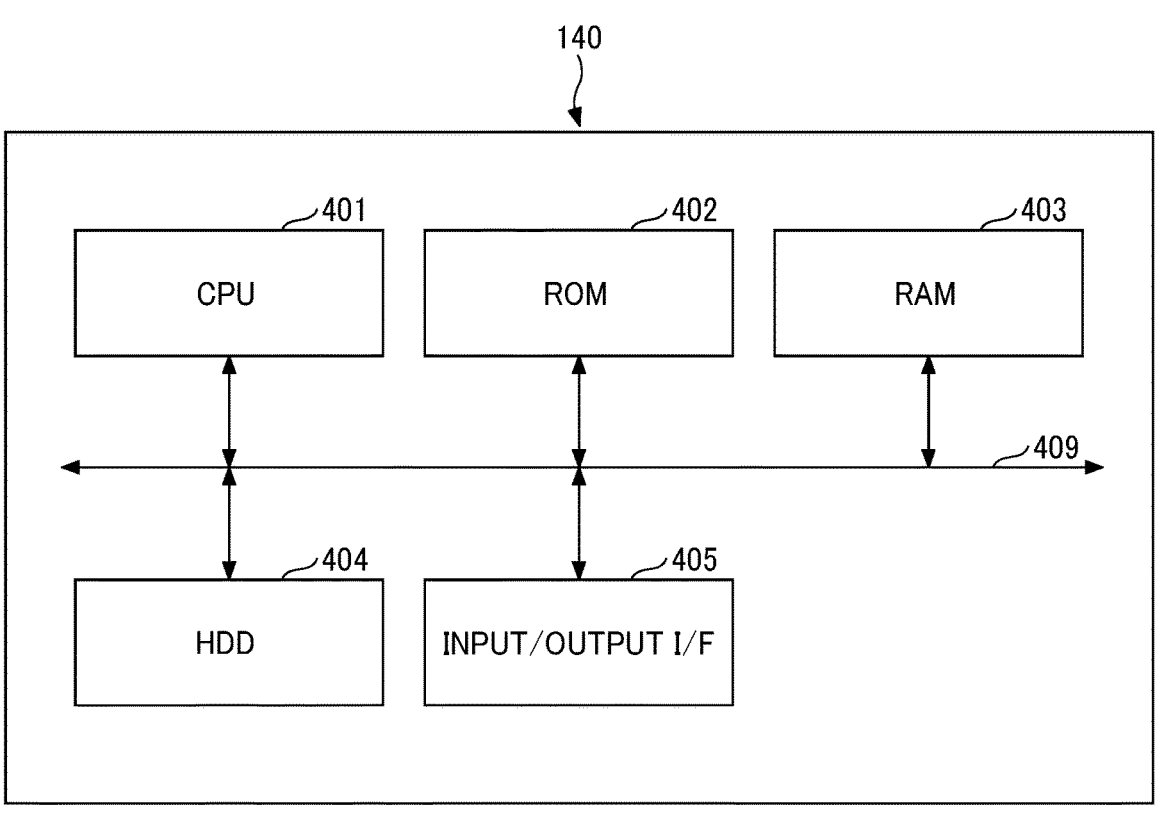
FIG. 5 is a block diagram illustrating an example of a hardware configuration of a controller included in the main inspection device according to the first embodiment of the disclosure.
Figure 6:
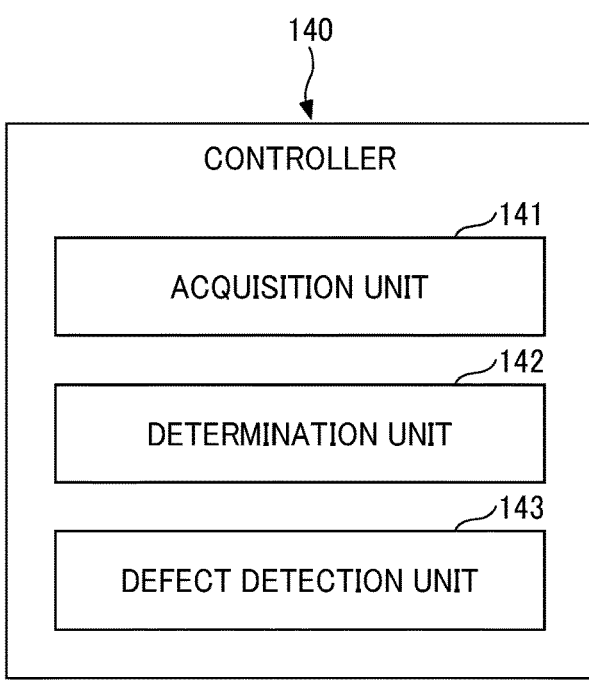
FIG. 6 is a block diagram illustrating an example of a functional configuration of the controller included in the main inspection device according to the first embodiment of the disclosure.

The main inspection device 100 according to the first embodiment of the disclosure is described referring to FIGS. 4 to 6. FIG. 4 is a front view of the main inspection device 100 according to the first embodiment of the disclosure. FIG. 5 is a block diagram illustrating an example of a hardware configuration of a controller included in the main inspection device 100 according to the first embodiment of the disclosure. FIG. 6 is a block diagram illustrating an example of a functional configuration of the controller included in the main inspection device 100 according to the first embodiment of the disclosure.

As illustrated in FIG. 4, the main inspection device 100 includes a main body 110, the illumination unit 120, the light receiver 130, and a controller 140.

A conveyance unit 3 conveys a car body 2. The main body 110 is a housing of the main inspection device 100. For example, the main body 110 has a gate-shaped structure that covers the periphery of the conveyance unit 3 that conveys the car body 2. Specifically, the main body 110 includes side walls 111 and 112 located at positions near both sides of the conveyance unit 3, and an upper wall 113 extending over upper ends of the side walls 111 and 112. A car body passing region 114 is a region inside the main body 110. The car body 2 is conveyed and inspected in the car body passing region 114. The main inspection device 100 of the first embodiment is described as a fixed car body inspection device in which the illumination unit 120 and the light receiver 130 are fixed to the main body 110. In one example, the number of main inspection devices 100 may be plural.

The illumination unit 120 is disposed on inner surfaces of the side walls 111 and 112 and an inner surface of the upper wall 113 of the main body 110 to face the car body 2 conveyed by the conveyance unit 3. When the car body 2 is conveyed to the car body passing region 114, the illumination unit 120 illuminates the entire surface of the paint surface 2P. The entire surface of the paint surface 2P may be simultaneously illuminated, or passing areas of the paint surface 2P passing through the car body passing region 114 may be sequentially illuminated.

The light receiver 130 includes multiple light receivers 130 disposed on the inner surfaces of the side walls 111 and 112 and the inner surface of the upper wall 113 of the main body 110. The multiple light receivers 130 capture images of respective different areas of the paint surface 2P. The areas may partially overlap each other. When the main inspection device 100 is fixed, an illumination unit and a light receiver of the auxiliary inspection device 200 are desirably not fixed and are movable. In one example, the illumination unit 120 and the light receivers 130 of the main inspection device 100 may be movable, and the illumination unit and the light receiver of the auxiliary inspection device 200 may be fixed. In another example, the illumination unit and the light receiver of each of the main inspection device 100 and the auxiliary inspection device 200 may be movable. The auxiliary inspection device 200 itself may be movable.

The controller 140 performs control such that the main inspection device 100 inspects the first inspection area from which the light receiver 130 has received the specular reflection light. The controller 140 may perform control such that the auxiliary inspection device 200 inspects the second inspection area. The controller 140 may be an information processing device such as a personal computer (PC). FIG. 5 illustrates an example of a hardware configuration of the controller 140.

The controller 140 includes a central processing unit (CPU) 401, a read only memory (ROM) 402, a random access memory (RAM) 403, a hard disk drive (HDD) 404, and an input/output interface (I/F) 405. These components are electrically connected to one another via a bus 409.

The CPU 401 controls the operation of the controller 140. The ROM 402 stores a program or the like that is executed in the CPU 401. The RAM 403 is used as a work area for the CPU 401. The HDD 404 stores various data such as a program. The input/output I/F 405 is an interface that inputs or outputs various signals or data from or to an external device.

Part or all of the functions of the CPU 401 may be implemented by an electronic circuit, such as an application specific integrated circuit (ASIC) or a field-programmable gate array (FPGA).

An example of a functional configuration of the controller 140 is described next referring to FIG. 6. The controller 140 includes an acquisition unit 141, a determination unit 142, and a defect detection unit 143. For example, a car body detection sensor may be disposed near the conveyance unit 3, and the controller 140 may control the operations of the illumination unit 120 and the light receiver 130 based on detection signals from the sensor. The controller 140 may further include another functional component.

The acquisition unit 141 acquires image information output from each of the multiple light receivers 130.

The acquisition unit 141 outputs the acquired image information to the determination unit 142. The acquisition unit 141 is implemented by, for example, the input/output I/F 405.

The determination unit 142, for example, analyzes each item of the image information and determines whether the image information includes the second inspection area. In this case, the determination unit 142 may use, as a determination index, a numerical value relating to brilliance such as luminance or illuminance included in the image information. That is, the determination unit 142 may determine whether the light receiver 130 has received the specular reflected light from the paint surface 2P of the car body 2 based on the index relating to the brilliance included in the image information.

The determination unit 142 may set a predetermined threshold value relating to the brilliance, and determine that the specular reflection light has been received for the image information in which the numerical value relating to the brilliance is the predetermined threshold value or less.

The determination unit 142 may refer to, for example, measurement data obtained using a three-dimensional measurement method, such as a phase shift method, a light section method, or a time of flight (ToF) method, and stored in advance in the ROM 402, the HDD 404, or the like. The determination unit 142 may further refer to, for example, shape information on the car body 2 obtained from design data such as three-dimensional computer-aided design (CAD) stored in advance in the ROM 402, the HDD 404, or the like; or information relating to the positional relationship with respect to each of the illumination unit 120 and the light receiver 130.

The determination unit 142 may generate temporary information in advance to identify candidates for the first inspection area and the second inspection area on the paint surface 2P of the car body 2. The determination unit 142 may compare actually acquired image information to the temporary information to determine whether the specular reflection light has been received, based on the image information. By determining whether the specular reflection light has been received, it is determined whether the image information includes the first inspection area or the second inspection area. The determination accuracy for the second inspection area can be increased.

When a three-dimensional measurement method is used, the determination unit 142 may calculate three-dimensional information on, for example, the posture or position of the car body 2. Specifically, the determination unit 142 may calculate three-dimensional information on, for example, the posture or position of the car body 2 based on a combination of point group data constructed from measurement data at multiple positions within the paint surface 2P and the shape information on the car body 2. For example, the controller 140 stores three-dimensional information on the car body 2, and the determination unit 142 can calculate the posture or position of the car body 2 by matching using three-dimensional information obtained by the three-dimensional measurement method.

Coordinate data constructing the three-dimensional information may be converted using an integer conversion filter or the like. The posture, position, or the like of the car body 2 may be directly calculated from the point group data.

The determination unit 142 outputs image information on which the determination unit 142 determines that the specular reflection light has been received, to the defect detection unit 143. Also, the determination unit 142 outputs image information on which the determination unit 142 determines that the specular reflection light is not received, to the auxiliary inspection device 200. That is, the image information determined to include the first inspection area by the determination unit 142 is output to the defect detection unit 143. The image information determined to include the second inspection area by the determination unit 142 is output to the auxiliary inspection device 200. In one example, the image information determined to include the second inspection area by the determination unit 142 may be output to at least one of a display installed near the auxiliary inspection device 200 and another information processing device (a tablet terminal or a wearable device) held by an inspector carrying the auxiliary inspection device 200, or may be displayed by being directly projected on the paint surface 2P of the car body 2. The auxiliary inspection device 200 may process the output image information to display the second inspection area, or may use the image information as operation information of the auxiliary inspection device 200. Examples of information relating to the second inspection area include image information indicating the position, size, or range of the second inspection area. The determination unit 142 is implemented by, for example, the CPU 401 or the input/output I/F 405.

The defect detection unit 143 analyzes the image information including the first inspection area and detects a surface defect included in the first inspection area. Examples of the process for detecting a surface defect include a process of extracting a feature value such as the size of a defect of the first inspection area, and determining the presence of a defect based on the extracted feature value.

In one example, the defect detection unit 143 may execute a noise reduction process or the like on the image information as a pre-process. The defect detection unit 143 is implemented by, for example, the CPU 401.

Auxiliary Inspection Device

Figures 7A, 7B:
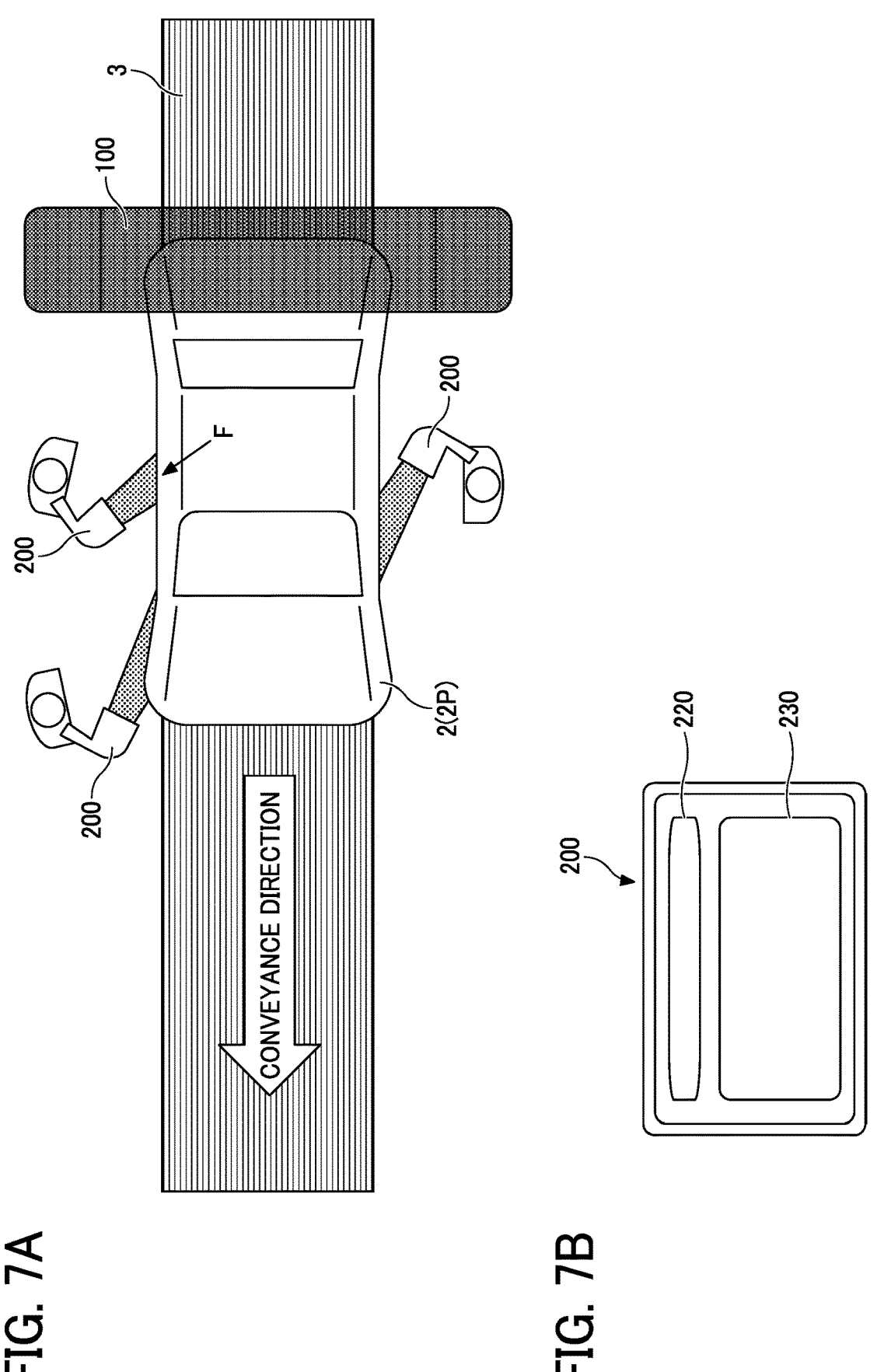
FIGS. 7A and 7B are schematic views illustrating an example of an auxiliary inspection device according to the first embodiment of the disclosure.

The auxiliary inspection device 200 according to the first embodiment of the disclosure is described next referring to FIGS. 7A, 7B, 8, and 9. FIGS. 7A and 7B are schematic views illustrating an example of the auxiliary inspection device 200 according to the first embodiment of the disclosure. In FIGS. 7A and 7B, like reference signs are applied to components identical or corresponding to components illustrated in, for example, FIG. 4, and redundant description is omitted.

FIG. 7A illustrates the main inspection device 100 and the auxiliary inspection device 200 that inspect the car body 2 conveyed by the conveyance unit 3. FIG. 7B is a front view of the auxiliary inspection device 200 (a view of the auxiliary inspection device 200 in a direction of arrow F in FIG. 7A).

As illustrated in FIG. 7B, the auxiliary inspection device 200 includes an illumination unit 220 and a light receiver 230. The illumination unit 220 illuminates the second inspection area. The illumination unit 220 includes an optical member such as a light source. An inspector carrying the auxiliary inspection device 200 causes the illumination unit 220 to face the second inspection area. Thus, the illumination unit 220 illuminates the second inspection area.

The light receiver 230 receives specular reflection light from the second inspection area. Thus, image information on the second inspection area is acquired. The illumination unit 220 and the light receiver 230 of the auxiliary inspection device 200 illustrated in FIGS. 7A and 7B are not fixed and are movable. With this configuration, the second inspection area that could not be inspected by the main inspection device 100 can be inspected.

Figure 8:
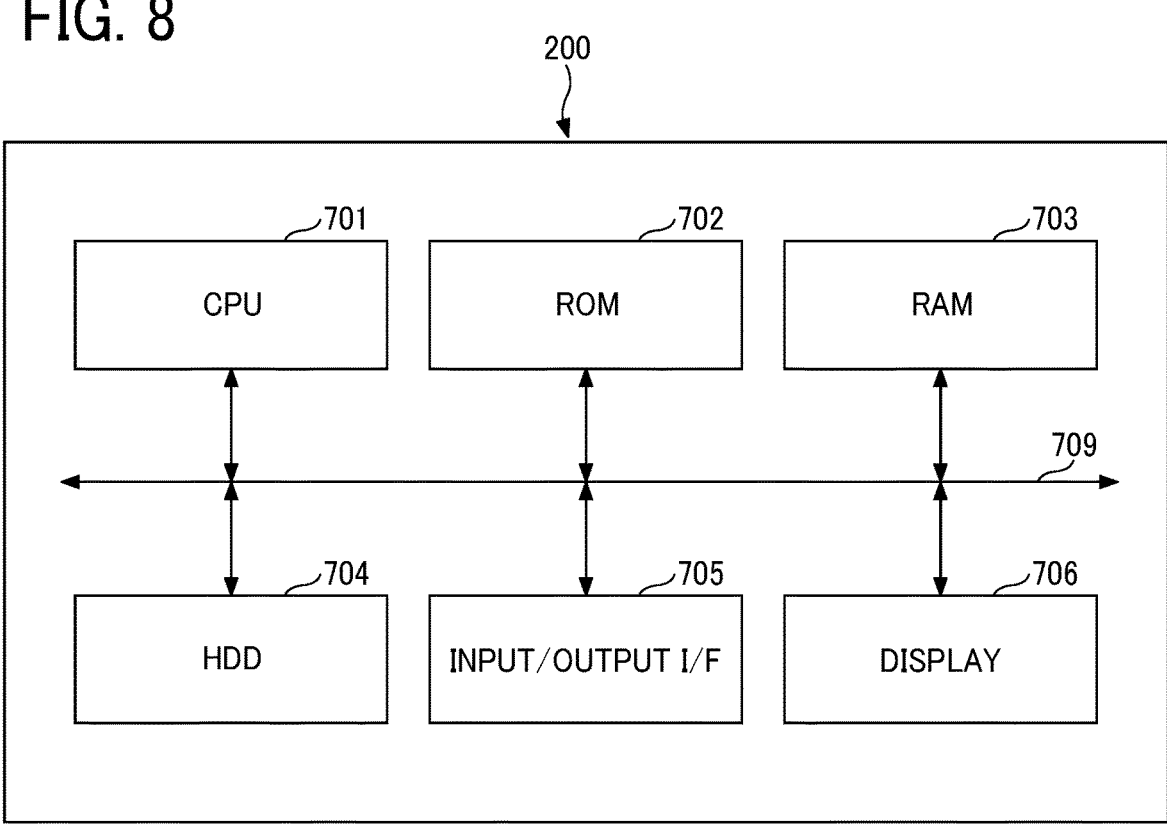
FIG. 8 is a block diagram illustrating an example of a hardware configuration of the auxiliary inspection device according to the first embodiment of the disclosure.

FIG. 8 is a block diagram illustrating an example of a hardware configuration of the auxiliary inspection device 200 according to the first embodiment of the disclosure. In FIG. 8, like reference signs are applied to components identical or corresponding to components illustrated in, for example, FIGS. 5 and 6, and redundant description is omitted.

As illustrated in FIG. 8, the auxiliary inspection device 200 includes a computer including a CPU 701, a ROM 702, a RAM 703, a HDD 704, an input/output I/F 705, and a display 706. These components are electrically connected to one another via a bus 709. The auxiliary inspection device 200 of the first embodiment is a terminal device that is carried by an inspector.

The CPU 701 controls the operation of the auxiliary inspection device 200. The ROM 702 stores a program or the like that is executed in the CPU 701. The RAM 703 is used as a work area for the CPU 701. The HDD 704 stores various data such as a program. The input/output I/F 705 is an interface that inputs or outputs various signals or data from or to an external device. The display 706 displays character information or image information to be presented to the inspector.

Figure 9:
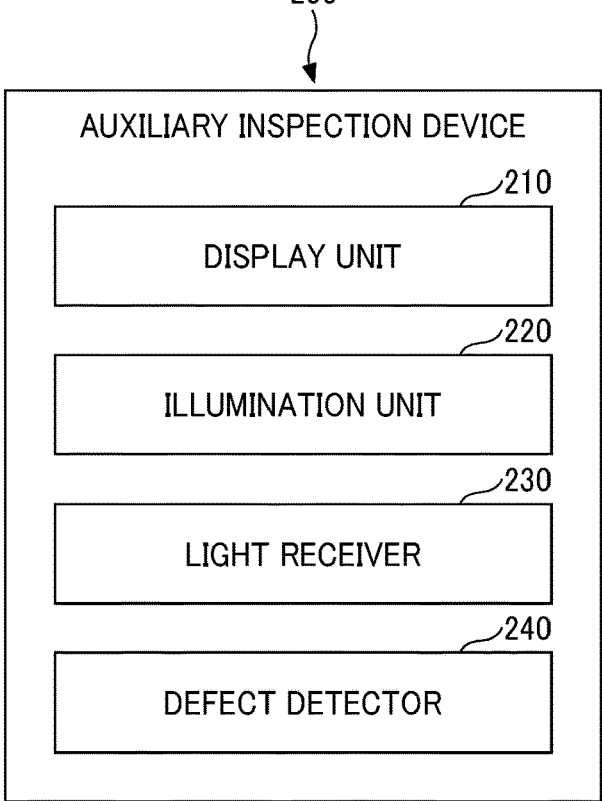
FIG. 9 is a block diagram illustrating an example of components included in the auxiliary inspection device according to the first embodiment of the disclosure.

FIG. 9 is a block diagram illustrating an example of components included in the auxiliary inspection device 200 according to the first embodiment of the disclosure.

The auxiliary inspection device 200 includes a display unit 210, an illumination unit 220, a light receiver 230, and a defect detection unit 240. The number of auxiliary inspection devices 200 is desirably plural to increase inspection efficiency. The illumination unit 220 and the light receiver 230 have been described referring to FIG. 7B, and hence the detailed description is omitted.

The display unit 210 displays the information on the second inspection area output from the determination unit 142. An example of the information on the second inspection area displayed on the display unit 210 is image information indicating the position, size, or range of the second inspection area on the paint surface 2P of the car body 2. The display unit 210 is implemented by, for example, the display 706.

The defect detection unit 240 analyzes the image information on the second inspection area captured by the light receiver 230 and detects a defect in the second inspection area. The defect detection unit 240 is implemented by, for example, the CPU 701.

The auxiliary inspection device 200 may measure the distance to the paint surface 2P of the car body 2 or the angle with respect to the paint surface 2P. The auxiliary inspection device 200 may have a function of correcting a motion blur when the light receiver 230 is not fixed. In one example, the auxiliary inspection device 200 may polish a defect in the paint surface 2P to repair the defect. Thus, productivity of the car body 2 can be increased.

A car body inspection device includes a main inspection device including: an illuminator to illuminate a surface of a car body; a light receiver to receive specular reflection light from a first inspection area of the surface illuminated by the illuminator; and a controller configured to inspect the first inspection area based on the specular reflection light received by the light receiver. The main inspection device is coupled to an auxiliary inspection device to inspect a second inspection area other than the first inspection area on the surface, and the light receiver of the main inspection device does not receive the specular reflection light in the second inspection area.

Car Body Inspection Method

Figure 10:
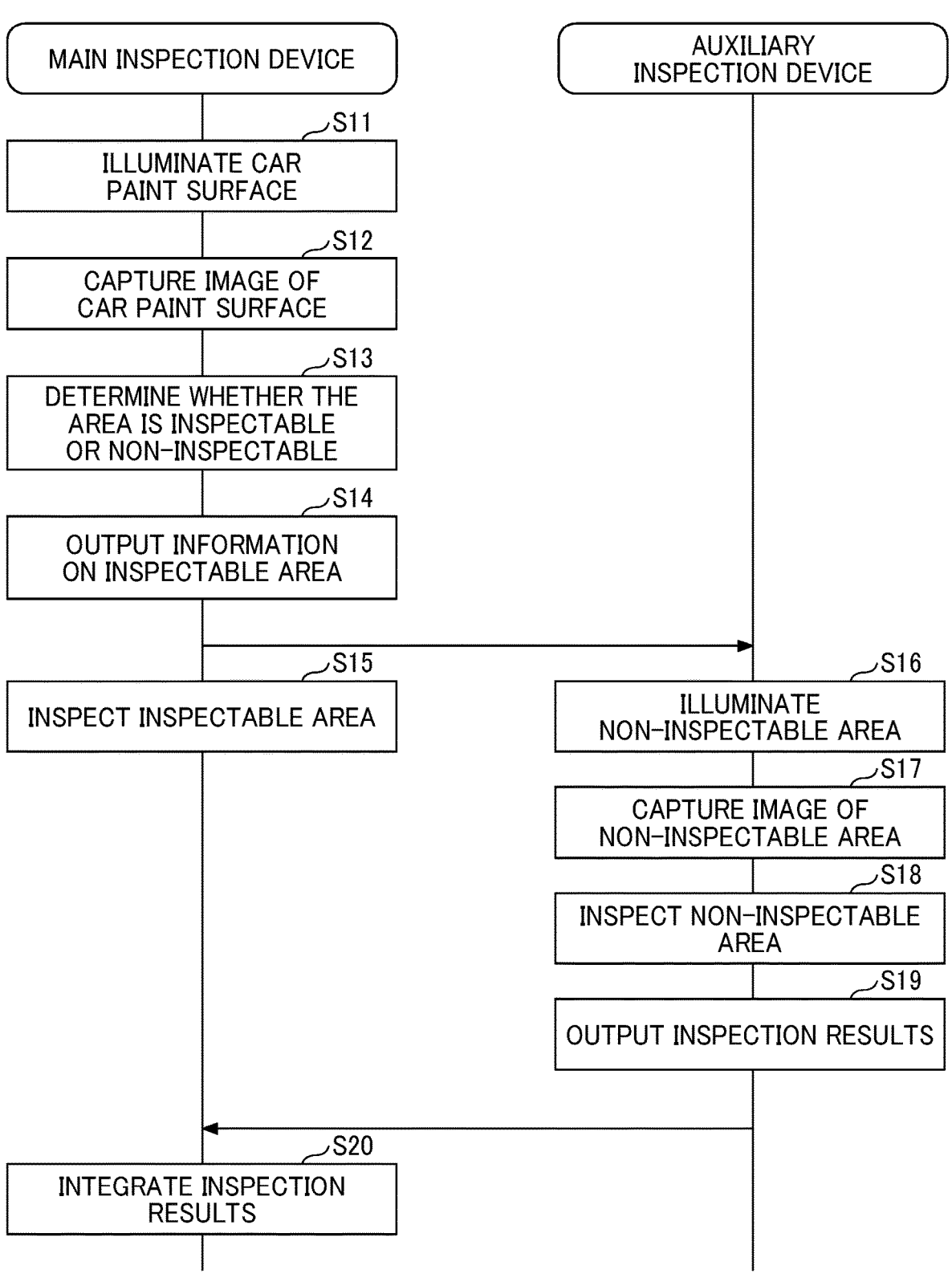
FIG. 10 is a sequence chart presenting a car body inspection method according to the first embodiment of the disclosure.

A car body inspection method according to the first embodiment of the disclosure is described next referring to FIG. 10. FIG. 10 is a sequence chart presenting a car body inspection method according to the first embodiment of the disclosure. In FIG. 10, the first inspection area is referred to as an inspectable area, and the second inspection area is referred to as a non-inspectable area.

In step S11, the illumination unit 120 of the main inspection device 100 illuminates a paint surface 2P of a car body 2.

In step S12, the light receiver 130 of the main inspection device 100 receives specular reflection light from an area of the paint surface 2P illuminated by the illumination unit 120. Thus, image information on the paint surface 2P is acquired. When multiple light receivers 130 are provided, image information on multiple areas of the paint surface 2P of the car body 2 is acquired. The light receiver 130 outputs the image information to the controller 140.

In step S13, the controller 140 performs control such that the main inspection device 100 inspects a first inspection area from which the light receiver 130 has received the specular reflection light, and the auxiliary inspection device 200 inspects a second inspection area from which the light receiver 130 does not receive the specular reflection light.

Specifically, the determination unit 142 of the controller 140 analyzes the image information of the light receiver 130 and determines the first inspection area and the second inspection area on the paint surface 2P of the car body 2. The determination unit 142 may determine whether the light receiver 130 has received the specular reflection light based on at least one of the positions of the illumination unit 120 and the light receiver 130, and the shape of the paint surface 2P. When the determination unit 142 determines the first inspection area and the second inspection area, the determination unit 142 may use an inspection result of another car body of the same car type as the car type of the car body 2, which has been inspected before the current inspection. A storage medium, such as a radio frequency identification (RFID) tag or a two-dimensional barcode, may be attached to the conveyance unit 3 that conveys the car body 2. The determination unit 142 may read information on the car type or the like of the car body 2 from the attached storage medium and identify the information on the car type or the like of the car body 2. The inspection result of the other car body may be stored in, for example, the ROM 402 or the HDD 404 of the controller 140. The image information corresponds to the specular reflection light received by the light receiver 130.

In step S14, the determination unit 142 outputs the image information including the second inspection area to the auxiliary inspection device 200.

In step S15, the determination unit 142 outputs the image information on the first inspection area to the defect detection unit 143 of the main inspection device 100. The defect detection unit 143 analyzes the image information on the first inspection area and detects a surface defect in the first inspection area.

In contrast, in step S16, the illumination unit 220 of the auxiliary inspection device 200 illuminates the second inspection area.

In step S17, the light receiver 230 of the auxiliary inspection device 200 receives specular reflection light. Thus, image information on the second inspection area is acquired. The light receiver 230 outputs the image information on the second inspection area to the defect detection unit 240.

In step S18, the defect detection unit 240 of the auxiliary inspection device 200 analyzes the image information on the second inspection area and detects a defect in the second inspection area.

In step S19, the auxiliary inspection device 200 outputs the defect detected by the defect detection unit 240 to the main inspection device 100.

In step S20, the main inspection device 100 integrates the defect in the first inspection area and the defect in the second inspection area.

With these steps, the car body inspection method according to an embodiment of the disclosure is performed. However, the car body inspection method according to the embodiment of the disclosure may appropriately include another step in accordance with an inspection condition, an inspection environment, or the like.

When the paint surface 2P of the car body 2 is inspected by one car body inspection device, the number of members included in the inspection optical system, such as the illumination unit 120 and the light receiver 130, is to be increased to inspect the entire surface of the paint surface 2P without generating a non-inspectable area. Consequently, the inspection cost significantly increases. In addition, various conditions, such as the positions, numbers, orientations, illumination range, and angle of view of the illumination unit 120 and the light receiver 130, are to be adjusted for each car body 2 conveyed. Thus, inspection efficiency decreases. In contrast, in the car body inspection system 1 according to the first embodiment, the illumination unit 120 and the light receiver 130 are adjusted in advance, and areas in which the car body 2 is inspected are distributed to the main inspection device 100 and the auxiliary inspection device 200. Thus, for example, in the main inspection device 100, when car bodies 2 have different appearances and are conveyed in random order by the conveyance unit 3, the adjustment of the illumination unit 120 and the light receiver 130 can be omitted. Thus, according to the first embodiment, since the entire paint surface 2P of the car body 2 is inspected by the main inspection device 100 and the auxiliary inspection device 200, both inspection accuracy and inspection efficiency can be increased.

The embodiments have been described above; however, the present disclosure is not limited to the above-described embodiments and can be modified and improved in various ways within the scope of the disclosure.

Aspects of the disclosure are, for example, as follows.

Aspect 1

According to Aspect 1, a car body inspection device that is connected to an auxiliary inspection device includes an illumination unit that illuminates a surface of a car body, a light receiver that receives specular reflection light from an area on the surface illuminated by the illumination unit, and a controller that performs control such that the car body inspection device inspects a first inspection area from which the light receiver has received the specular reflection light. The auxiliary inspection device inspects a second inspection area from which the light receiver does not receive the specular reflection light.

Aspect 2

According to Aspect 2, in the car body inspection device of Aspect 1, information relating to the second inspection area is output to the auxiliary inspection device.

Aspect 3

According to Aspect 3, in the car body inspection device of Aspect 1 or Aspect 2, the controller performs control such that the auxiliary inspection device inspects the second inspection area.

Aspect 4

According to Aspect 4, in the car body inspection device of any one of Aspect 1 to Aspect 3, the first inspection area and the second inspection area do not overlap each other on the surface of the car body.

Aspect 5

According to Aspect 5, in the car body inspection device of any one of Aspect 1 to Aspect 4, the controller determines the first inspection area and the second inspection area based on at least one of image information acquired by the light receiver, positions of the illumination unit and the light receiver, and a shape of the surface.

Aspect 6

According to Aspect 6, in the car body inspection device of any one of Aspect 1 to Aspect 5, the auxiliary inspection device includes multiple auxiliary inspection devices, and the multiple auxiliary inspection devices inspect the second inspection area.

Aspect 7

According to Aspect 7, in the car body inspection device of any one of Aspect 1 to Aspect 6, the car body inspection device is fixed, and the auxiliary inspection device includes a terminal device that is carried by an inspector.

Aspect 8

According to Aspect 8, a car body inspection system includes a main inspection device, and an auxiliary inspection device. The main inspection device includes an illumination unit that illuminates a surface of a car body, a light receiver that receives specular reflection light from an area on the surface illuminated by the illumination unit, and a controller that performs control such that the main inspection device inspects a first inspection area from which the light receiver has received the specular reflection light. The main inspection device inspects the first inspection area. The auxiliary inspection device inspects a second inspection area from which the light receiver does not receive the specular reflection light.

Aspect 9

According to Aspect 9, a car body inspection method of inspecting a surface of a car body using a main inspection device and an auxiliary inspection device includes, in the main inspection device, illuminating the surface of the car body, receiving specular reflection light from an area on the illuminated surface, inspecting a first inspection area from which the specular reflection light has been received, and, in the auxiliary inspection device, inspecting a second inspection area from which the main inspection device does not receive the specular reflection light.

Aspect 10

A car body inspection device includes a main inspection device including: an illuminator to illuminate a surface of a car body; a light receiver to receive specular reflection light from a first inspection area of the surface illuminated by the illuminator; and circuitry configured to inspect the first inspection area based on the specular reflection light received by the light receiver. The main inspection device is coupled to an auxiliary inspection device to inspect a second inspection area other than the first inspection area on the surface, and the light receiver of the main inspection device does not receive the specular reflection light in the second inspection area.

Aspect 11

In the car body inspection device according to Aspect 10, the circuity outputs information relating to the second inspection area to the auxiliary inspection device.

Aspect 12

In the car body inspection device according to Aspect 10 or 11, the circuity controls the auxiliary inspection device to inspect the second inspection area.

Aspect 13

In the car body inspection device according to any one of Aspects 10 to 12, the first inspection area and the second inspection area do not overlap each other on the surface of the car body.

Aspect 14

In the car body inspection device according to any one of Aspects 10 to 13, the circuitry is further configured to: determine the first inspection area and the second inspection area based on at least one of: image information corresponding to the specular reflection light received by the light receiver; positions of the illuminator and the light receiver, or a shape of the surface.

Aspect 15

The car body inspection device according to any one of Aspects 10 to 14, further includes multiple auxiliary inspection devices including the auxiliary inspection device. The circuitry controls the multiple auxiliary inspection devices to inspect the second inspection area.

Aspect 16

In the car body inspection device according to any one of Aspects 10 to 15, the main inspection device is fixed, and the auxiliary inspection device includes a portable terminal device.

Aspect 17

A car body inspection system includes a main inspection device including: an illuminator to illuminate a surface of a car body; a light receiver to receive specular reflection light from a first inspection area of the surface illuminated by the illuminator; and circuitry configured to inspect the first inspection area based on the specular reflection light received by the light receiver; and an auxiliary inspection device coupled to the main inspection device to inspect a second inspection area other than the first inspection area on the surface. The light receiver of the main inspection device does not receive the specular reflection light in the second inspection area.

Aspect 18

A car body inspection method includes illuminating a surface of a car body; receiving specular reflection light from a first inspection area of the surface illuminated; inspecting the first inspection area based on the specular reflection light received from the first inspection area; and inspecting a second inspection area other than the first inspection area in which the specular reflection light is not received by the receiving, to inspect the surface of the car body.

Any one of the above-described operations may be performed in various other ways, for example, in an order different from the one described above.

The invention claimed is:
1. A car body inspection device comprising:
  a main inspection device including:
    an illuminator to illuminate a surface of a car body;

a light receiver to receive specular reflection light from a first inspection area of the surface illuminated by the illuminator; and circuitry configured to inspect the first inspection area based on the specular reflection light received by the light receiver, wherein the main inspection device is coupled to an auxiliary inspection device to inspect a second inspection area other than the first inspection area on the surface, the light receiver of the main inspection device does not receive the specular reflection light in the second inspection area, the circuitry is further configured to:

control the auxiliary inspection device to inspect the second inspection area, and determine the first inspection area and the second inspection area based on at least one of:

image information corresponding to the specular reflection light received by the light receiver;

positions of the illuminator and the light receiver, or a shape of the surface, the main inspection device is fixed, and the auxiliary inspection device includes a portable terminal device.

2. The car body inspection device according to claim 1, wherein the circuitry outputs information relating to the second inspection area to the auxiliary inspection device.

3. The car body inspection device according to claim 1, wherein the first inspection area and the second inspection area do not overlap each other on the surface of the car body.

4. The car body inspection device according to claim 1, wherein the auxiliary inspection device is provided in plurality, and each of the auxiliary inspection devices includes circuitry to control the operation of the auxiliary inspection device.

5. A car body inspection system comprising:

a main inspection device including:

an illuminator to illuminate a surface of a car body;

a light receiver to receive specular reflection light from a first inspection area of the surface illuminated by the illuminator; and circuitry configured to inspect the first inspection area based on the specular reflection light received by the light receiver; and an auxiliary inspection device coupled to the main inspection device to inspect a second inspection area other than the first inspection area on the surface, wherein the light receiver of the main inspection device does not receive the specular reflection light in the second inspection area, the circuitry is further configured to:

control the auxiliary inspection device to inspect the second inspection area, and determine the first inspection area and the second inspection area based on at least one of:

image information corresponding to the specular reflection light received by the light receiver;

positions of the illuminator and the light receiver, or a shape of the surface, the main inspection device is fixed, and the auxiliary inspection device includes a portable terminal device.

6. A car body inspection method comprising:

illuminating a surface of a car body;

receiving specular reflection light from a first inspection area of the surface illuminated;

inspecting the first inspection area based on the specular reflection light received from the first inspection area;

inspecting a second inspection area other than the first inspection area in which the specular reflection light is not received by the receiving, to inspect the surface of the car body;

controlling the auxiliary inspection device to inspect the second inspection area, determining the first inspection area and the second inspection area based on at least one of:

image information corresponding to the specular reflection light received by the light receiver;

positions of the illuminator and the light receiver, or a shape of the surface, wherein the main inspection device is fixed, and the auxiliary inspection device includes a portable terminal device.

* * * * *